April 27, 1954 R. L. CHASE 2,677,104
FREQUENCY MEASURING INSTRUMENT
Filed Feb. 28, 1951 8 Sheets-Sheet 1

FIG. I.

Inventor
ROBERT L. CHASE

By Roland A. Anderson
Attorney

April 27, 1954  R. L. CHASE  2,677,104
FREQUENCY MEASURING INSTRUMENT
Filed Feb. 28, 1951  8 Sheets-Sheet 3

FIG. 3.

Unknown Frequency

Pulse Shaper Output

FIG. 3c. Starting Pulse

Gate 30

Gate 80

Scaler Input

Scaler Input (5 Mc. Pulses)

Scaler Output

Inventor
ROBERT L. CHASE
By Roland A. Anderson
Attorney

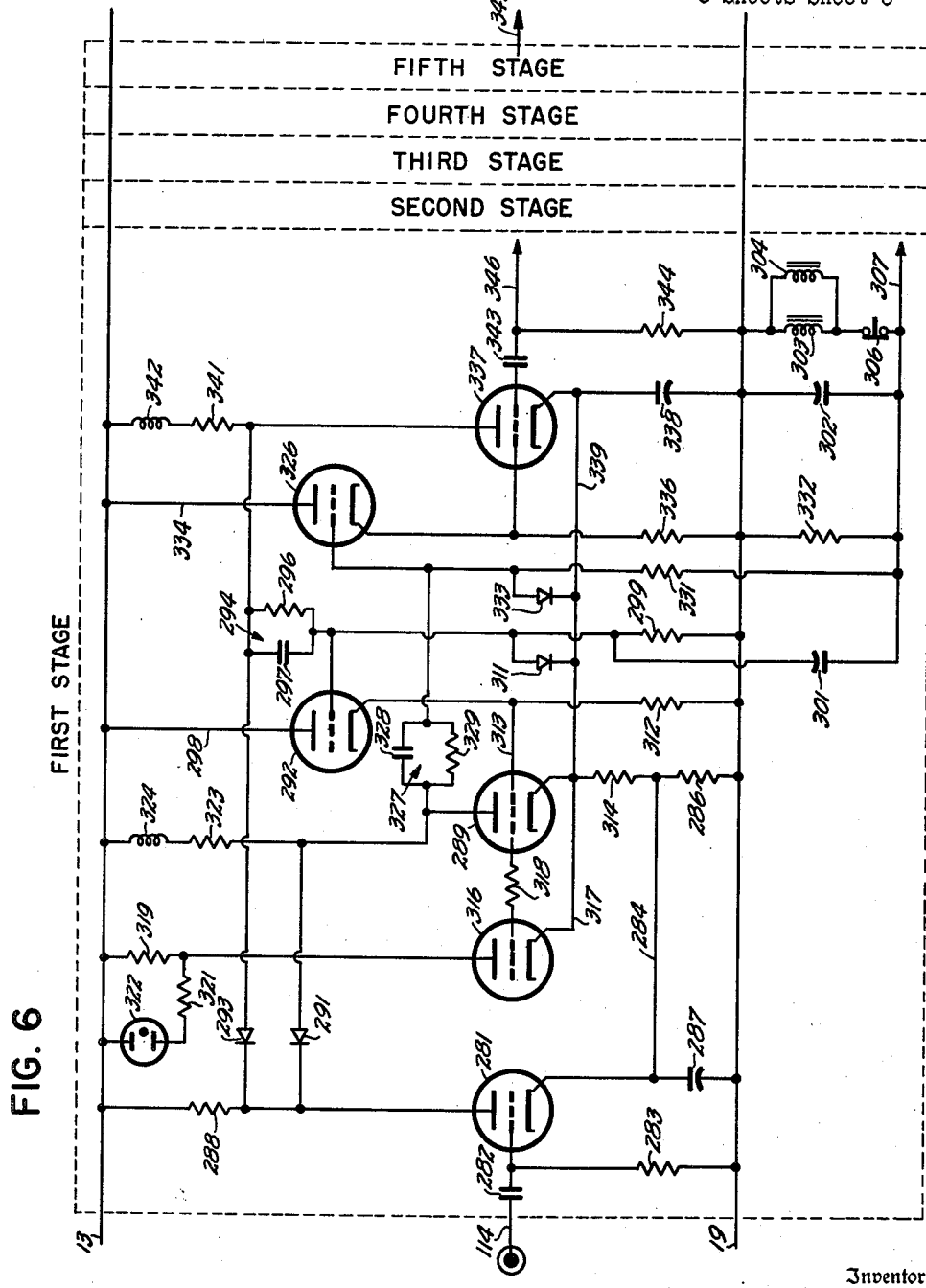

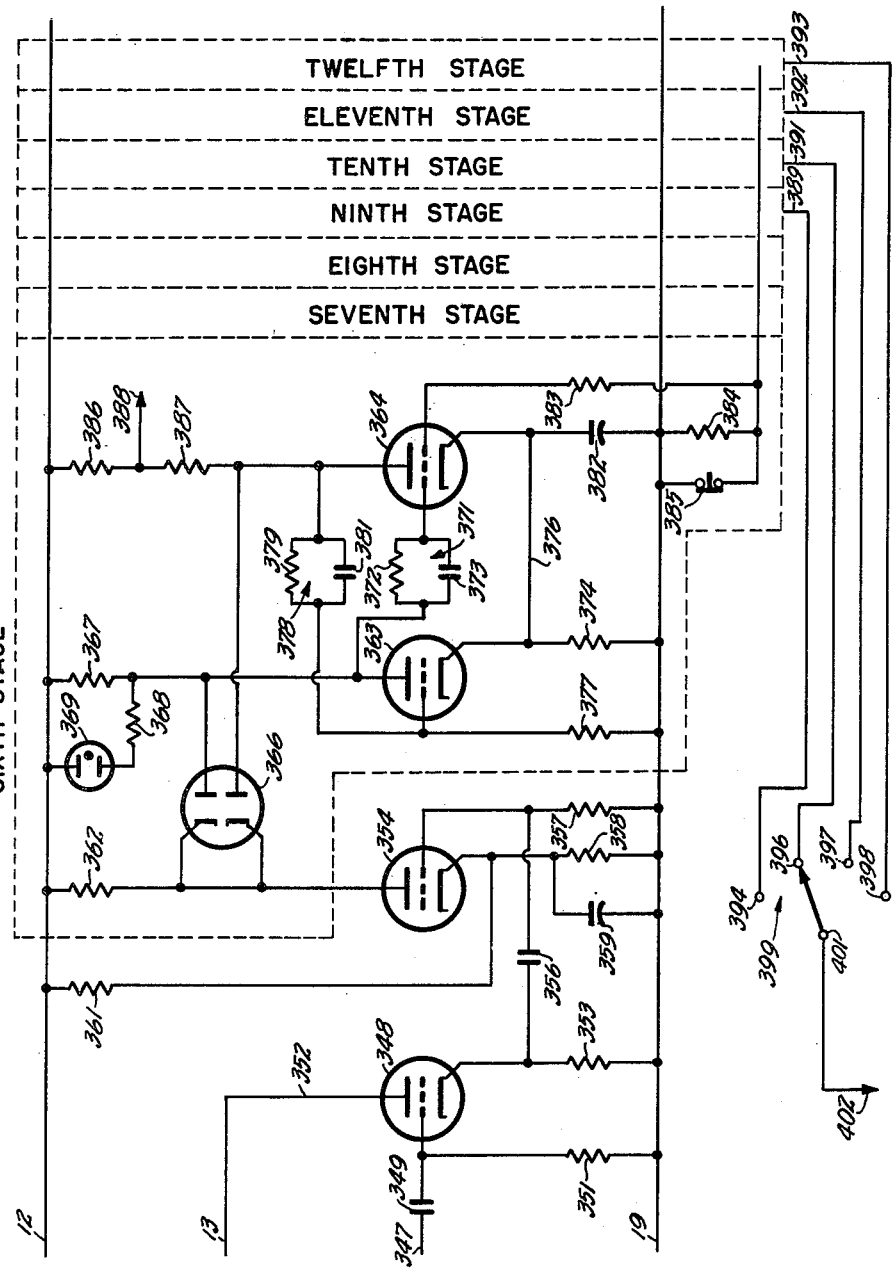

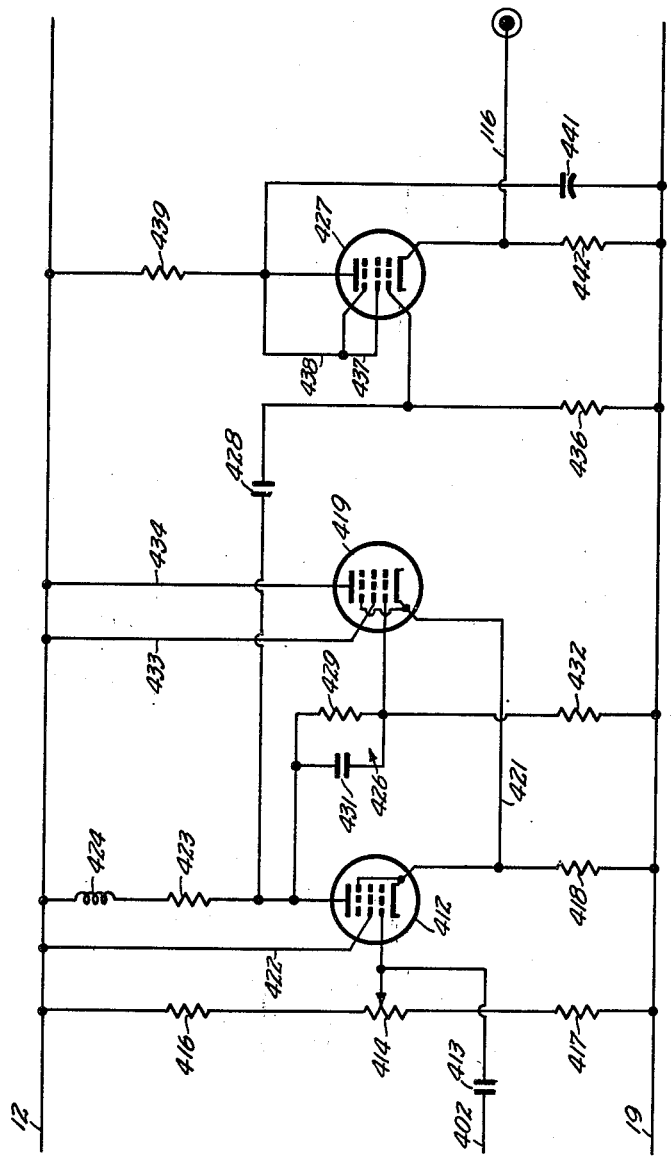

Patented Apr. 27, 1954

2,677,104

UNITED STATES PATENT OFFICE 2,677,104

FREQUENCY MEASURING INSTRUMENT

Robert L. Chase, New York, N. Y., assignor to the United States of America as represented by the United States Atomic Energy Commission Application February 28, 1951, Serial No. 213,193

4 Claims. (Cl. 324—78)

The present invention relates to a method and apparatus for accurately measuring an unknown frequency.

Electronic oscillators are employed in a wide variety of instruments and apparatus in industry today. It is often necessary to measure the frequency of these oscillators to insure the proper operation of the instrument controlled thereby. When the oscillator is frequency modulated, it is also necessary to measure the frequency at a particular instant after the start of the modulation cycle. In the latter case, the measurement must be made in a very short time interval as the frequency is continuously varying.

It is accordingly an object of this invention to provide a new and improved method and apparatus for the measurement of an unknown frequency.

Another object of the invention is to provide a new and improved circuit which will accurately measure a varying frequency at any particular instant.

A further object of the invention is to provide a new and improved circuit for measuring an unknown frequency in a very short time interval.

Still another object of the invention is to provide a new and improved circuit for measuring an unknown frequency which circuit is synchronized with the phase of the unknown frequency.

Other objects and advantages will be in part obvious and in part pointed out hereinafter.

More particularly, a preferred embodiment of the apparatus of the present invention comprises a source of standard oscillations, amplifying and recording means for counting the number of the standard oscillations emitted in a specified time interval, a second amplifying and recording means for counting the number of cycles of the unknown frequency for said specified time interval, and means for controlling the duration of the specified time interval.

The many objects and advantages of the present invention may best be appreciated by reference to the accompanying drawings, the figures of which illustrate apparatus incorporating a preferred embodiment of the present invention and capable of carrying out the method of the invention. In the drawings:

Figure 6 is a schematic wiring diagram of the first five stages of the recording circuit used for the unknown frequency oscillations.

Figure 7 is a schematic wiring diagram of the sixth through twelfth stages of the recording circuit used for the unknown frequency oscillations and Figure 8 is a schematic wiring diagram of the pulsing circuit in which the terminating pulse for the counting time interval is derived.

Figure 1:
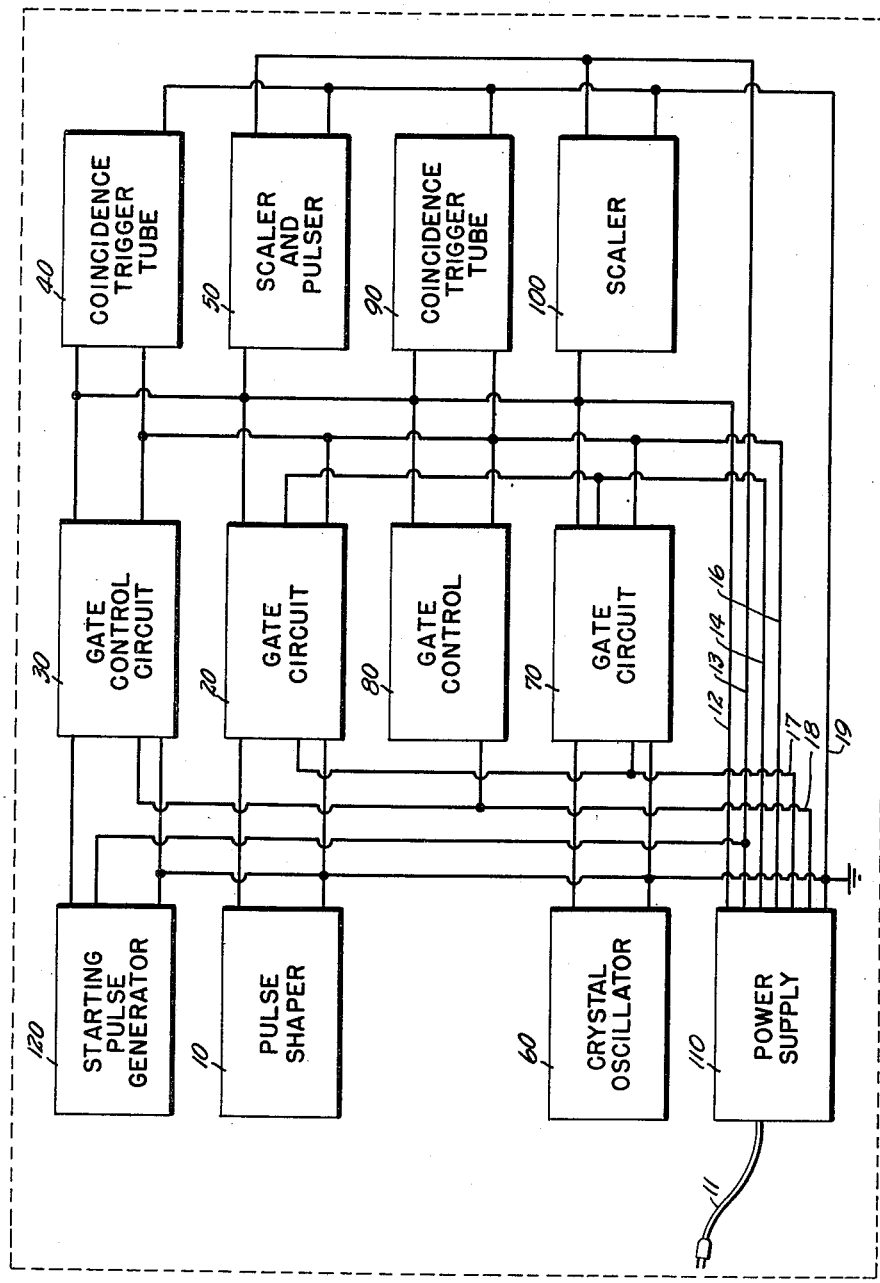
Figure 1 is a block diagram showing the power distribution from the power supply to the various circuits of the invention.

Referring now to certain of the drawings in detail, the operative features of the disclosed units of which will later be described, there is shown in Figure 1 a power supply 110 which has an external connection 11 to a standard alternating current source. The power supply 110 furnishes unidirectional operation voltages 12, 13, 14, 16, 17, 18 and has a common ground connection 19. The voltages 12, 13 and 14 are positive and the values of these voltages decrease from the highest voltage 12 to the lowest voltage 14. The voltages 16, 17 and 18 are negative and the values of these voltages increase in negative value from the least negative voltage 16 to the most negative voltage 18. Also shown in Figure 1 are blocks representing the circuits of the invention; namely, a pulse shaping circuit 10, a gate circuit 20, a gate control circuit 30, a coincidence trigger tube circuit 40, a scaler and pulser circuit 50, a source of standard oscillations such as a crystal oscillator 60, a second gate circuit 70, a second gate control circuit 80, a second coincidence trigger tube circuit 90, a second scaling circuit 100 and a starting pulse generator 120. The distribution of the voltages supplied by the power supply 110 to the various circuits of the invention is shown schematically. A detailed discussion of the connections to the voltages will be given in the description of the circuits herein below.

Figure 2:
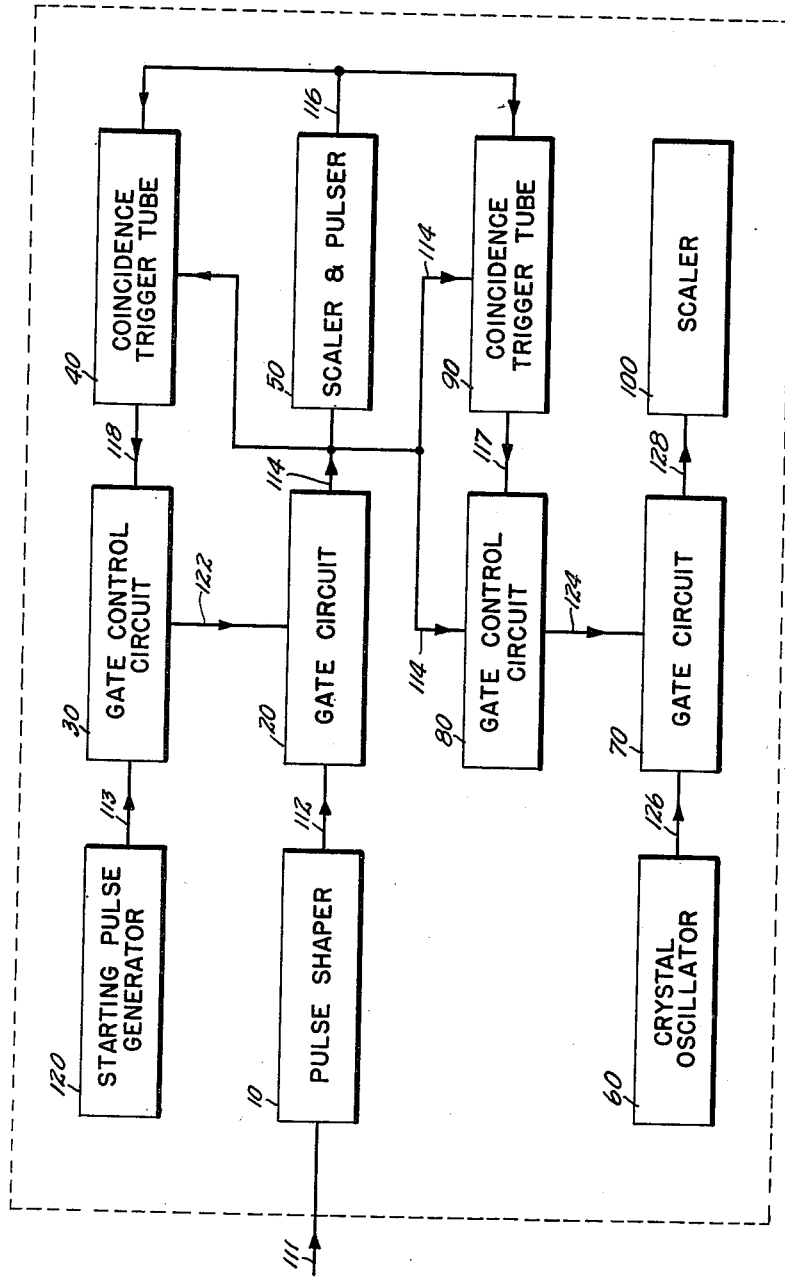
Figure 2 is a block diagram showing the manner in which the signal voltages are interconnected between the various circuits of the invention.
Figure 3A:
Figure 3 shows the wave form of voltages at indicated positions in the various circuits of the invention and comprises sub-figures 3A to 3H inclusive.
Figure 3B:
Figure 3D:
Figure 3E:
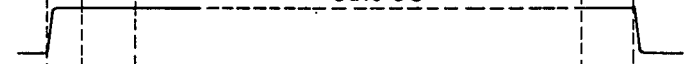
Figure 3F:
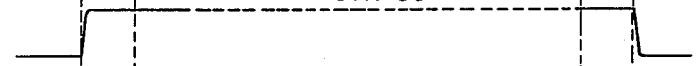
Figure 3G:
Figure 3H:

Figure 2 shows the over-all circuit in block form as in Figure 1 and shows the signal voltage connections between the circuits.

An output lead 113 connects the output of starting pulse generator 120 to the gate control circuit 30. Lead 111 is connected to the input of the pulse shaping circuit 10. An output lead 112 of the pulse shaping circuit 10 is connected to the gate circuit 20. An output lead 114 of the gate circuit 20 is connected in parallel to the scaling circuit 50, the coincidence trigger tube 40, the gate control circuit 80 and to the second coincidence trigger tube 90. A lead 116 of the scaling and pulsing circuit 50 connects the output of circuit 50 to both coincidence trigger tube circuits 40 and 90. The gate control circuit 30 is connected to the output of coincidence tube circuit 40 by a lead 118 and is further connected to gate circuit 20 by a lead 122. An output lead 124 of gate control circuit 80 is connected to the second gate circuit 70. An input lead 126 to gate circuit 70 connects gate circuit 70 to the standard oscillator 60. An output lead 128 of gate circuit 70 is connected to the second scaling circuit 100.

Figure 3 shows several time correlated voltage wave forms of voltages at various referenced positions throughout the circuits of the invention. Discussion of these voltages and their wave forms will be made in the descriptions of the circuits.

Figure 4:
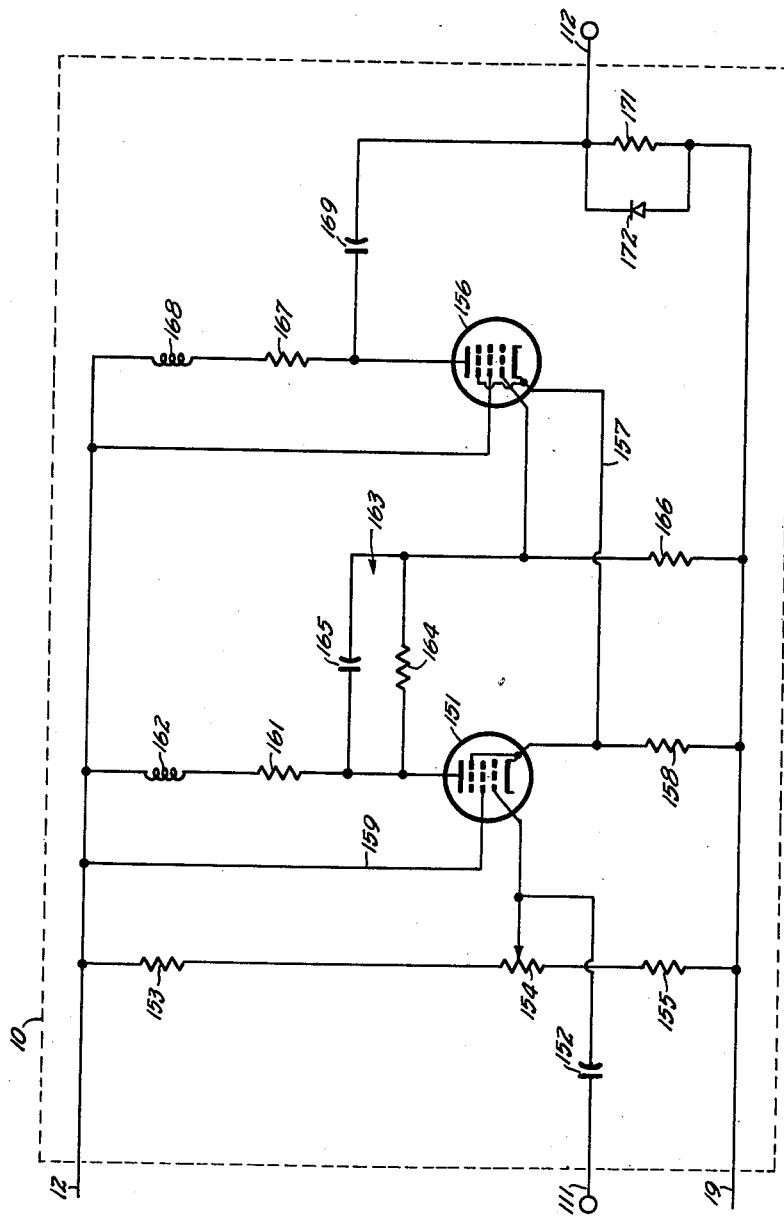
Figure 4 is a schematic wiring diagram of the pulse shaping circuit.

In Figure 4, the input lead 111 to the pulse shaper circuit 10 is shown connected to the control grid of a pentode type tube 151 through a coupling condenser 152. Bias for the control grid of tube 151 is supplied by a resistance network connected between the positive voltage 12 and the common ground connection 19. The resistance network consists of resistor 153, potentiometer 154 and resistor 155. The movable arm of potentiometer 154 is connected to the control grid of the tube 151. The cathode of tube 151 is internally connected to the suppressor grid and is further connected to the cathode of pentode type tube 156 by lead 157 and to ground through cathode resistor 158. The screen grid of tube 151 is directly connected to the positive voltage 12 by a lead 159. The anode of this tube 151 is connected to the positive voltage 12 through an anode resistor 161 and inductor 162, and is further connected to the control grid of tube 156 by a coupling network 163 comprising a parallel connected resistor 164 and condenser 165.

The control grid of tube 156 is connected to ground through a grid bias resistor 166. The remaining connections of tube 156 are as follows: The anode is connected to the positive voltage 12 through an anode resistor 167 and inductor 168 and to ground through a differentiating network consisting of condenser 169 and resistor 171. A crystal rectifier 172 is connected in parallel with resistor 171. Output lead 112 is connected to the junction point of condenser 169 and resistor 171.

In operation, the lead 111 supplies the pulse shaper circuit 10 with a voltage as shown on Figure 3–A. The pulse shaper circuit 10 transforms each cycle of this voltage into a positive pulse as shown on Figure 3–B. In detail, pulse shaper 10 operates on the principle of the well known Schmitt trigger circuit. The bias voltages of tubes 151 and 156 are arranged so that normally, tube 151 is cut off and tube 156 is conducting. The conduction of current through tube 156 maintains the cathode of tube 151 at a relatively high positive voltage. This will succeed in keeping tube 151 cut off until the potential of the control grid of tube 151 is raised sufficiently to overcome the cathode bias. This will occur on the positive half cycle of the wave shape shown on Figure 3–A. As this positive voltage builds up on the grid of tube 151 a point is reached where tube 151 will start to conduct. This will give rise to a negative pulse at the anode of tube 151 which pulse is transmitted to the control grid of tube 156 through coupling network 163. Tube 156 is thereby cut off causing a positive pulse at its anode. This pulse is sharpened by the differentiating network made up of condenser 169 and resistor 171 so that the pulse appearing on output lead 112 is shaped as shown in Figure 3–B.

When the amplitude of the positive half cycle applied to the control grid of tube 151 falls to a certain value, the pulse shaping circuit will return to its normal state with tube 151 cut off and with tube 156 conducting. The negative pulse that results at the anode of the tube 156 when it starts to conduct does not appear on the output lead 112 since rectifier 172 shorts out all negative pulses across resistor 171 to ground. The pulse shaping circuit 10 therefore emits one positive pulse on output lead 112 for every cycle of voltage appearing on input lead 111.

Figure 5:
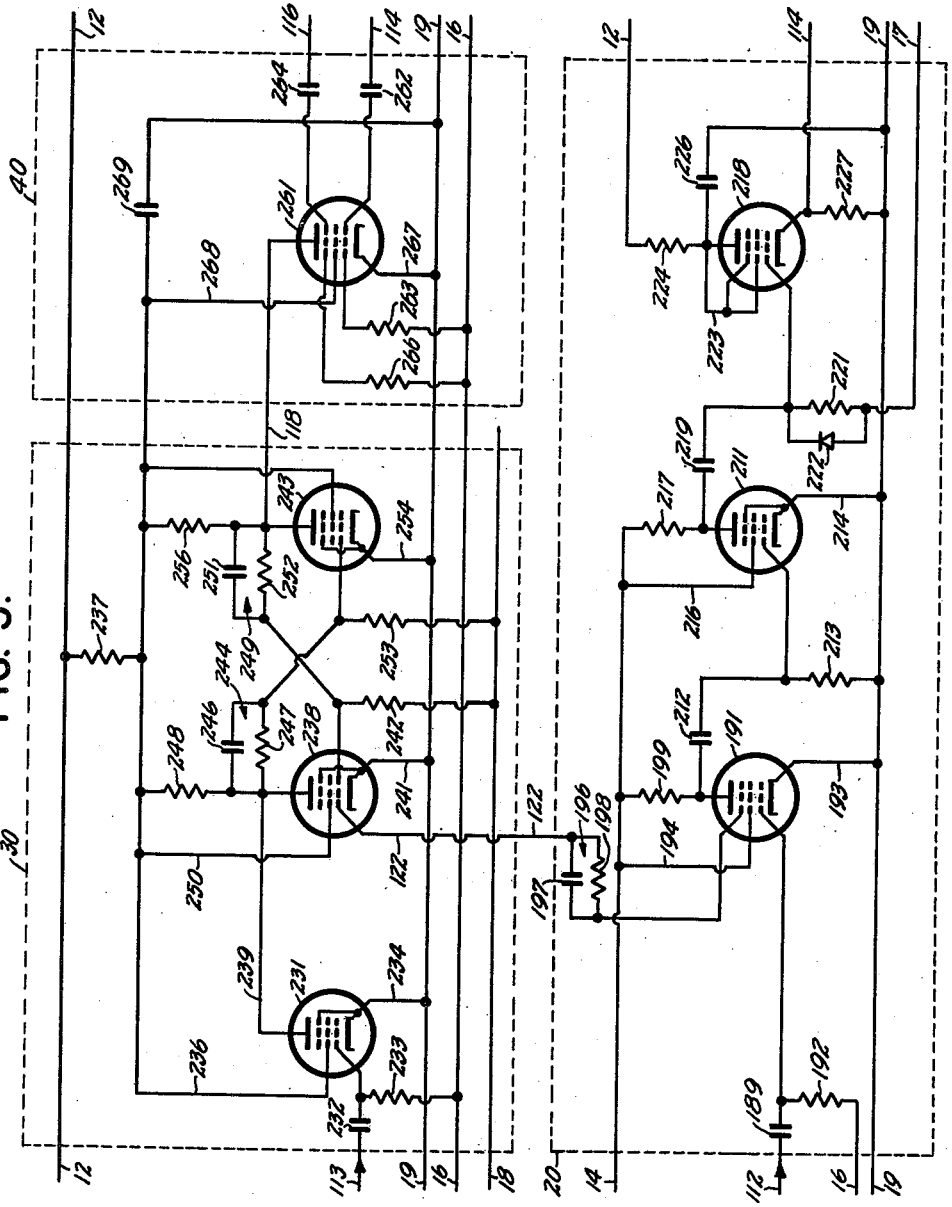
Figure 5 is a schematic wiring diagram of the gate circuit, the gate control circuit and the coincidence trigger tube circuit used for the pulses derived from the unknown alternating current source.

Referring now to Figure 5, lead 112 as previously disclosed is adapted to supply a voltage, such as shown on Figure 3–B, through coupling condenser 189 to the control grid of a pentode type tube 191 of gate circuit 20. The control grid of the tube 191 is further connected to negative voltage 16 through a grid bias resistor 192. The remaining connections of the tube 191 are as follows: The cathode is directly connected to the common ground connection 19 by a lead 193, the screen grid is directly connected to the positive voltage 14 by a lead 194 and the suppressor grid is connected to the output lead 122 of gate control circuit 30 through a coupling network 196. Coupling network 196 consists of a parallel connected condenser 197 and resistor 198. The anode of the tube 191 is connected to the positive voltage 14 through a dropping resistor 199 and to the control grid of pentode type tube 211 through a coupling condenser 212. The control grid of the tube 211 is further connected to the common ground 19 through resistor 213. The remaining connections of tube 211 are as follows: The cathode and suppressor are directly connected to the common ground 19 by a lead 214 and the screen grid is directly connected to the positive voltage 14 by a lead 216. The anode of tube 211 is connected to the positive voltage 14 through an anode resistor 217 and to the control grid of cathode follower tube 218 through a coupling condenser 219. The control grid of the tube 218 is further connected to the negative voltage 17 through a resistor 221 and a crystal rectifier 222 connected in parallel. The screen and suppressor grids of tube 218 are connected directly to the anode by lead 223. The anode is connected to positive voltage 12 through dropping resistor 224 and to ground through condenser 226. The output lead 114 is connected directly to the cathode of the tube 218 and the cathode is connected to ground through cathode resistor 227.

In operation, the gate circuit 20 receives pulses on input lead 112 as shown on Figure 3–B and transmits the pulses to output lead 114 only during the unknown frequency counting time interval. It also amplifies and shapes the pulses. In detail, when the tube 191 is in condition to conduct, the receipt on its control grid of the positive pulse shown in Figure 3–B gives rise to an amplified negative pulse at its anode. This negative pulse is applied to the control grid of amplifier tube 211 through the differentiating network made up of condenser 212 and resistor 213. This pulse on the grid of tube 211 gives rise to an amplified positive pulse at its anode, which pulse is applied to the control grid of cathode follower tube 218 through the differentiating network consisting of condenser 219 and resistor 221. When this positive pulse is applied on the control grid of tube 218, the potential across cathode resistor 227 rises in the same manner as the applied pulse. The resulting pulse across resistor 227 is applied to output lead 114. The waveshape of this pulse is shown on Figure 3–F. The rectifier 222 in parallel with resistor 221 removes any negative portions of the voltage wave form applied to the control grid of tube 218.

It is therefore seen that gate circuit 20 will emit an amplified positive pulse on output lead 114 for each positive pulse received on input lead 112. As mentioned above, however, this is only true if gate tube 191 is in condition to conduct. This condition is controlled by gate control circuit 30 as described hereinbelow.

Gate control circuit 30 receives its input on input lead 113 which is connected to the control grid of buffer amplifier tube 231 through a coupling condenser 232. The control grid of the tube 231 is further connected to the negative potential 16 through resistor 233. The remaining connections of this tube 231 are as follows: the suppressor grid is internally connected to the cathode which is directly connected to the common ground 19 by lead 234; the screen grid is connected to the positive potential 12 by lead 236 through dropping resistor 237. The anode is directly connected to the anode of tube 238 by lead 239.

The suppressor grid of the tube 238 is internally connected to the cathode which is directly connected to the common ground 19 by a lead 241. Further connections of tube 238 are as follows: the screen is connected to the positive voltage 12 by lead 250 and dropping resistor 237. The control grid is connected to the negative voltage 18 through a bias resistor 242 and is directly connected to output lead 122. The control grid is further connected to the anode of tube 243 through a coupling network 249. Network 249 comprises a parallel connected condenser 251 and resistor 252.

The anode of the tube 238 is connected to the positive voltage 12 through anode resistor 248 and dropping resistor 237 and is further connected to the control grid of tube 243 through a coupling network 244. Coupling network 244 consists of a parallel connected condenser 246 and resistor 247. The remaining connections of tube 243 are as follows: the control grid is connected to negative voltage 18 through a bias resistor 253, the suppressor grid is internally connected to the cathode which is directly connected to ground by lead 254. The anode is connected to positive voltage 12 through anode resistor 256 and dropping resistor 237 and is further connected to lead 118.

In operation, the gate control circuit 30 receives a positive pulse input on lead 113 as shown on Figure 3–C. The circuit operates to provide a rectangular voltage on output lead 122 as shown on Figure 3–D. In detail, tubes 238 and 243 and their associated elements of the gate control circuit 30 are interconnected in the form of an electronic switch or better known as a flip-flop circuit. The tube 243 is normally conducting and the tube 238 is normally nonconducting. The action of the flip-flop circuit is conventional in that a negative voltage impressed at the control grid of the tube 243 causes this tube to become nonconducting and the tube 238 to become conducting. To return the circuit to its normal operating condition, it is then necessary to impress a negative voltage at the control grid of the tube 238. The negative pulse to initiate the flip-flop action is derived from the buffer amplifier tube 231. A positive pulse as shown on Figure 3–C is applied on input lead 113 to the control grid of tube 231.

This starting pulse serves to mark the beginning of the timing interval during which the unknown frequency is to be measured. The application of this positive pulse at the control grid of tube 231 gives rise to a negative amplified pulse at the anode of tube 231. The negative pulse is applied to the control grid of tube 243 through coupling network 244. This initiates the flip-flop action causing tube 243 to become nonconducting and tube 238 to become conducting.

The positive pulse is derived from starting pulse generator 120 shown in block form on Figure 2. Starting pulse generator 120 may be any conventional apparatus which is adapted for synchronization with the initiation of the frequency modulation cycle of a frequency modulated oscillator, or which may operate at random for the measurement of fixed frequencies. For example, a counter-chronograph or single-shot multivibrator may be used. The anode of tube 243 increases in potential when this tube is cut off as shown on Figure 3–D vertical line a. This increase in potential is applied through coupling network 249 to the output lead 122. The gate control circuit 30 therefore provides an increase in positive potential on the output lead 122 when the starting pulse is applied to input lead 113. The increased potential remains on lead 122 until the flip-flop circuit of gate control 30 is restored to its normal condition with tube 243 conducting. This is accomplished in a manner to be set forth in detail later in the application.

The positive potential on lead 122 is applied to the suppressor grid of tube 191 in gate circuit 20 through coupling network 196. The application of the positive potential to the suppressor grid places tube 191 in condition to conduct. The pulses being applied to input lead 112 will now be transmitted through the gate circuit 20 to output lead 114 in the manner described hereinabove. The gate control circuit 30 accordingly blocks the gate circuit 20 by keeping a low potential on the suppressor grid of tube 191 until the start of the measuring interval when the flip-flop action of tubes 238 and 243 is initiated.

Also shown on Figure 5 is the coincidence trigger tube circuit 40. Input lead 114 is connected to the control grid of pentode type tube 261 through coupling condenser 262. The control grid is also connected to the negative potential 16 through grid resistor 263. Input lead 114 is connected to the suppressor grid of the tube 261 through coupling condenser 264. The suppressor grid is also connected to the negative potential 16 through resistor 266. The remaining connections of this tube 261 are as follows: the anode is directly connected to output lead 118 and the cathode is directly connected to the common ground 19 by lead 267. The screen grid is connected to the common ground 19 through condenser 269 and to the positive voltage 12 by lead 268 and dropping resistor 237.

In operation, coincidence trigger tube circuit 40 emits a negative pulse on output lead 118 when it receives a positive pulse input on lead 116. The positive pulse on lead 116 is derived from scaler and pulser 50 at the end of a predetermined number of cycles of the unknown alternating current source and marks the end of the measuring interval. The positive pulse output of scaler 50 is shown on Figure 3-H just after vertical line *e*. The operation of the pulse forming portion of scaler 50 will be described below with respect to Figure 8.

In detail, in Figure 5, the control grid of the tube 261 receives positive pulses on lead 114 as shown on Figure 3-F. These pulses are derived from gate circuit 20 as described hereinabove. The application of these positive pulses on the control grid of tube 261 does not cause this tube to conduct as its suppressor grid is being kept at the negative potential 16. This effectively blocks conduction in tube 261 and prevents any output voltage from appearing on lead 118.

When the positive pulse shown on Figure 3-H—line *e* is applied to the suppressor grid of the tube 261, the tube is unblocked and is in condition to conduct. The next positive pulse to be applied on lead 114 to the control grid of tube 261 will be amplified and inverted thereby causing a large negative pulse at the anode as well as on the output lead 118. The negative pulse on lead 118 is applied to the control grid of tube 238 of gate control circuit 30, through coupling network 249.

This negative pulse cuts off tube 238 restoring the flip-flop circuit to its normal operating condition. This reduces the potential on output lead 122, as shown on Figure 3-D—line *f*, thereby blocking the conduction of tube 191 in gate circuit 20. The input pulses subsequently applied to the control grid of the tube 191 will no longer pass through this tube and therefore no more pulses will be applied to scaler 50 on lead 114. In effect, the output of gate control circuit 30 is a rectangular voltage, the beginning of which starts the counting operation and the ending of which terminates the operation.

Referring to Figure 6, input lead 114 is shown connected to the control grid of tube 281 through condenser 282. The control grid of tube 281 is connected to the common ground connection 19 through grid resistor 283. The remaining connections of the tube 281 are as follows: the cathode is connected to the ground connection 19 through lead 284, cathode resistor 286 and bypass condenser 287. The anode is connected to the positive voltage 13 through anode resistor 288 and is further connected to the anode of tube 289 through a crystal rectifier 291.

The anode of the tube 281 is also connected to the control grid of tube 292 through a crystal rectifier 293 and a coupling network 294. Coupling network 294 consists of a parallel connected resistor 296 and condenser 297. The anode of the tube 292 is directly connected to the positive voltage 13 by a lead 298. The control grid of the tube 292 is connected to the ground connection 19 through grid resistor 299 and bypass condensers 301 and 302. In parallel with condenser 302 are inductors 303 and 304 which are in series with reset switch 306.

The control grid of the tube 292 is further connected to the cathode of tube 289 through crystal rectifier 311. The cathode of the tube 292 is connected to ground through cathode resistor 312 and is further directly connected to the control grid of the tube 289 by lead 313. The cathode of the tube 289 is connected to ground through resistors 314 and 286 and is further directly connected to the cathode of tube 316 by a lead 317. The control grid of tube 289 is connected to the control grid of tube 316 through a resistor 318.

The anode of the tube 316 is connected to the positive voltage 13 through an anode resistor 319 in parallel with the series connected resistor 321 and glow discharge tube 322. The anode of the tube 289 is connected to the positive potential 13 through anode resistor 323 and inductor 324 and is further connected to the control grid of tube 326 through coupling network 327. Coupling network 327 consists of parallel connected condenser 328 and resistor 329. The control grid of the tube 326 is connected to the ground connection 19 through resistors 331 and 332 and is further connected to the cathode of tube 289 through a crystal rectifier 333.

The anode of the tube 326 is directly connected to the positive voltage 13 by a lead 334. The cathode of the tube 326 is connected to the ground connection 19 through cathode resistor 336 and is further connected to the control grid of the tube 337. The cathode of the tube 337 is connected to ground through the bypass condenser 338 and is further directly connected to the cathode of the tube 289 by lead 339. The anode of the tube 337 is connected to the positive voltage 13 through anode resistor 341 and inductor 342 and is further connected to the junction point of crystal rectifier 293 and coupling network 294. The control grid of the tube 337 is connected to the common ground connection 19 through condenser 343 and resistor 344.

The output lead 346 is connected to the junction point between condenser 343 and resistor 344.

The above described circuit is the first stage of the scaler circuit 50 which is used to record the pulses shown on Figure 3-F appearing on lead 114. The scaler 50 may consist of as many stages as necessary for the recordation of the unknown frequency pulses.

In the present embodiment a scale of 4096 will be described but it is to be understood that more or less scaler stages may be used depending on the number of cycles of the unknown frequency to be measured. Since the scaler 50 is shown as having a scale-of-two circuit, in order to obtain a measure of 4096 cycles, it is necessary to have 12 stages, that is, 2 to the 12th power.

In operation, the first stage of the scaler 50 emits one output pulse on lead 346 for every two input pulses appearing on lead 114.

The tubes 289 and 337 are the switch tubes of this stage. Normally one of these tubes is conducting and the other nonconducting. Tube 292 is a cathode follower tube connected between the control grid of tube 289 and the anode of tube 337. Tube 326 is a cathode follower tube connected between the grid of tube 337 and the anode of tube 289. The operation of the switch tubes 289 and 337 is controlled by the output at the cathodes of the cathode follower tubes 292 and 326.

In detail, the switch tubes 289 and 337 and their associated circuit elements are arranged so that switch tube 337 is conducting and tube 289 is cut off. Maintenance of current flow through the tube 337 depends on the grid bias supplied to the control grid of the tube 337 from the cathode resistor 336 of tube 326. As long as the tube 326 conducts sufficiently, the positive voltage built up across the resistor 336 will maintain tube 337 in a conducting state. When less current flows through the tube 326 the grid bias on the control grid of the tube 337 will fall to such an extent that the tube 337 will be cut off. The conduction of the tube 326, in turn, depends on the grid bias developed at its control grid.

Therefore, as a positive pulse appears on the input lead 114 it will be amplified and inverted by the buffer amplifier tube 281 giving rise to an amplified negative pulse at the anode of this tube. This negative pulse is applied to the control grid of the tube 326 through rectifier 291 and coupling network 327. The negative pulse applied to the control grid of the tube 326 reduces the current in this tube causing the voltage established across the cathode resistor 336 to decrease. As hereinabove described this will cut off tube 337. When tube 337 is cut off a large positive pulse is developed at its anode and is applied to the control grid of the tube 292 through coupling network 294. This causes tube 292 to increase conduction and gives rise to an increased positive voltage across cathode resistor 312. This positive voltage is applied to the control grid of the tube 289 causing it to conduct. The switch tubes 289 and 337 will now remain in this stable state until the arrival of another positive pulse at the input lead 114. The positive voltage that is applied to the control grid of the tube 289 is also applied to the control grid of the tube 316 through the grid resistor 318. This causes the tube 316 to conduct and lights up the glow tube 322 in the anode circuit of the tube. The next positive pulse appearing at the input lead 114 will reverse the conduction conditions of the tube cutting off tubes 289 and 316 and initiating current flow in tube 337. It should also be noted that the positive pulse that initiated current flow through the tube 337 will also be applied on output lead 346 through condenser 343. In order to tell which condition the first stage of the scaler 50 is in, it is merely necessary to see whether the glow tube 322 is on or off. As described hereinabove tube 322 will light up when tube 289 is conducting and will be off when tube 289 is cut off.

It is accordingly seen that for every two input pulses appearing on lead 114 one output pulse appears on lead 346. Also glow tube 322 will light up every second pulse. In order to obtain our preferred scale of 4096 it would be possible to have 12 stages all similar to the first stage described above. However, under normal operating frequencies it would not be necessary to employ quite so large a scale. The switching action of the first stage of the scaler 50 is particularly fast and is therefore well adapted to be used directly with the incoming unknown frequency pulses. However, as the pulses progress through the various scaler stages the required switching operation speed becomes less and less.

The above described scaler stage is therefore used for the first five stages and a more conventional scale, known to the art as the Higinbotham scaler, is used for the next seven stages, the operation of which will be described below. The pulses progress through the second through fifth stages in exactly the same manner as in the first stage. Conductor 346 is applied to the buffer amplifier tube of the second stage in the same way that lead 114 is applied to amplifier tube 281 in the first stage. Lead 307, at the bottom of the Figure 6 is also connected to the switch tubes of the following stages in the manner shown. Lead 307 is used for resetting all the scaler stages to zero in a manner to be described later.

The output of the fifth scaler stage appears on lead 347 which corresponds to lead 346 of the first stage. Referring to Figure 7, the pulses appearing on lead 347 are applied to the control grid of the cathode follower tube 348 through coupling condenser 349. The control grid of the tube 348 is also further connected to the common ground connection 19 through resistor 351. The remaining connections of the tube 348 are as follows: the anode is directly connected to the positive voltage 13 by a lead 352. The cathode is connected to the common ground connection 19 through cathode resistor 353 and is further connected to the control grid of tube 354 through coupling condenser 356.

The control grid of the tube 354 is connected to the ground connection 19 through resistor 357 and the cathode is connected to the common ground 19 through cathode resistor 358 and by-pass condenser 359. The cathode of the tube 354 is further connected to the positive voltage 12 through resistor 361. The anode of this tube 354 is connected to the positive voltage 12 through anode resistor 362 and is further connected to the anode of tube 363 and the anode of tube 364 through separate halves of the double diode tube 366.

The anode of the tube 363 is connected to the positive voltage 12 through anode resistor 367 which is connected in parallel with the series connected resistor 368 and glow discharge tube 369. The anode of the tube 363 is further connected to the control grid of the tube 364 through the coupling network 371. Coupling network 371 consists of parallel connected resistor 372 and condenser 373. The remaining connections of the tube 363 are as follows: the cathode is connected to the common ground 19 through cathode resistor 374 and is directly connected to the cathode of tube 364 by lead 376.

The control grid of the tube 363 is connected to the common ground 19 through resistor 377 and is further connected to the anode of the tube 364 through the coupling network 378. Coupling network 378 comprises parallel connected resistor 379 and condenser 381. The cathode of the tube 364 is connected to the common ground 19 through resistor 374 and bypass condenser 382. The control grid of the tube 364 is connected to the common ground 19 through resistors 383 and 384 and mounted in parallel with resistor 384 is reset switch 385. The anode of the tube 364 is connected to the positive voltage 12 through resistors 386 and 387. An output lead 388 is connected to the junction point between resistors 386 and 387.

The above-described circuit includes the sixth stage of the scaling circuit 50 in the present embodiment as well as the coupling tubes 348 and 354 between the fifth and the sixth stage. The function of the sixth stage is the same as that described for the first stage, namely, to emit one positive pulse on output lead 388 for every two pulses appearing on input lead 347. However, the resolving time of the circuit need not be as short since the time interval between pulses received on input lead 347 is much longer than the interval between pulses received on input lead 114.

The operation of the sixth stage of scaler 50 is as follows: the switch tubes of the circuit are tubes 363 and 364. The tubes 363 and 364 and their associated circuit elements are arranged so that one of the tubes is cut off when the other tube is conducting. Let us assume that tube 363 is cut off and tube 364 is conducting. This means that the potential at the anode of the tube 364 will be much lower than the potential of the anode of the tube 363. A positive input pulse that is applied on lead 347 to the control grid of the cathode follower tube 348 will result in a positive pulse of substantially the same amplitude arising across cathode resistor 353.

This positive pulse is applied to the control grid of the tube 354 through the coupling condenser 356. The positive pulse applied to the control grid of the tube 354 increases the conduction current through this tube with a resulting of the voltage at the anode of the tube. The lowering of the anode voltage of the tube 354 causes the upper half of the coupling diode 366 to start conducting resulting in the application of the lowered voltage to the anode of the tube 363 and to the control grid of the tube 364 through the coupling network 371.

It should be noted that the lower half of the coupling diode 366 does not conduct as its plate is connected to the anode of the tube 364 which is at a lower voltage than the anode of the tube 363. The lowered voltage at the control grid of tube 364 causes the conduction current through this tube to decrease, resulting in a higher voltage at the anode of the tube 364. This higher voltage is applied to the control grid of the tube 363 through coupling network 378 and the regenerative action continues until the second stable state of the circuit is reached with tube 364 cut off and tube 363 conducting.

The circuit will remain in this condition until the next positive pulse is reached on the input lead 347 at which time the action will be reversed cutting off tube 363 and causing tube 364 to conduct. The glow discharge tube 369 in the anode circuit of the tube 363 will light up when this tube starts to conduct due to the voltage across resistor 367.

The cessation of current flow in tube 364 gives rise to a positive pulse on the output lead 388 and when the reverse action occurs with tube 364 starting to conduct, a negative pulse will appear at the output lead 388. Therefore the sixth stage of the scaling circuit 50 will emit one negative pulse for every two pulses appearing on input lead 347. The seventh through twelfth stages of scaler 50 preferably are exactly the same as the above-described sixth stage which is enclosed in the dotted line. The cathodes of the coupling diode to the seventh stage are connected directly to output lead 388. Therefore when the positive pulse appears on output lead 388 it is not transmitted to the seventh stage. However, when the negative pulse appears on output lead 388, that is transmitted to the seventh stage.

Accordingly, for every two pulses appearing on input lead 347, one pulse will be transmitted to the seventh stage of the scaler. No coupling tubes such as 348 and 354 are necessary between succeeding stages as they were inserted to provide a high impedance output for the fifth stage which was the type of circuit described above for Figure 6. The output pulses of each succeeding stage are applied to the input of the following stage. As shown in Figure 7, the ninth, tenth, eleventh and twelfth stages have additional output leads 389, 391, 392 and 393, respectively, which are connected to terminals 394, 396, 397 and 398, respectively, of selector switch 399. The common terminal 401 is connected to output lead 402.

The switching actions of the various scaler stages can continue up until the last or twelfth stage when the 4,096th pulse will start conduction in the last switch tube and give rise to a negative pulse on the output lead 393. However, if it is desired, the output pulse of either the ninth, tenth or eleventh stages may be obtained instead by operating selector switch 399 to the proper terminal. Use of selector switch 399 will be explained in more detail later in the application with respect to an illustrative example. Therefore the scaling circuit of Figure 7 operates to emit a negative pulse on output lead 402.

Referring now to Figure 8, the pulsing circuit of the scaler and pulser 50 is shown. A negative pulse derived as explained above with reference to Figure 7 is applied on lead 402 to the control grid of pentode-type tube 412 through the coupling condenser 413. The control grid of the tube 412 is also connected to the movable arm of potentiometer 414 which in turn is connected in series with resistors 416 and 417. The entire resistance series combination is connected between the positive voltage 12 and the common ground connection 19. The suppresser grid of the tube 412 is internally connected to the cathode which is connected to the common ground 19 through cathode resistor 418. The cathode of the tube 412 is also directly connected to the cathode of the tube 419 by lead 421.

The remaining connections of the tube 412 are as follows: the screen grid is directly connected to the positive voltage 12 by lead 422. The anode is connected to the positive voltage 12 through anode resistor 423 and inductor 424 and is further connected to the control grid of the tube 419 through coupling network 426 and to the control grid of the tube 427 through condenser 428. Coupling network 426 comprises the parallel connected resistor 429 and condenser 431. The control grid of the tube 419 is also connected to the common ground terminal 19 through resistor 432.

The remaining connections of the tube 419 are as follows: the suppresser grid is internally connected to the cathode. The screen grid is directly connected to the positive voltage 12 by lead 433 and the anode is directly connected to the positive voltage 12 by lead 434. In the tube 427 the control grid is connected to the common ground 19 through resistor 436. The screen grid, the suppresser grid and the anode are all connected together by leads 437 and 438. The anode of the tube 427 is connected to the positive voltage 12 through anode resistor 439 and is further connected to ground through condenser 441. The cathode is connected to the common ground 19 through cathode resistor 442 and is further connected directly to the output lead 116.

The function of the above-described circuit is to emit one positive pulse on output lead 116 as shown on Figure 3–H, vertical line e whenever it receives the negative pulse input on lead 402. In detail, this pulse circuit is the familiar Schmitt trigger circuit, the operation of which was described with respect to Figure 4 above.

In the circuit illustrated in Figure 8, tube 412 is normally nonconducting and tube 419 is normally conducting. The negative input pulse received on lead 402 is applied to the control grid of the tube 412 through coupling condenser 413. This lowers the conduction through tube 412 and gives rise to a higher voltage at its anode. This higher voltage is applied to the control grid of tube 419 through coupling network 426. The switching action is over when tube 412 is cut off and tube 419 is conducting.

The cessation of current through the tube 412 gives rise to a positive pulse at the anode of the tube which pulse is applied to the control grid of the cathode follower tube 427 through coupling condenser 428. The application of the positive pulse to the control grid of tube 427 gives rise to a similar positive pulse across the cathode resistor 442 which appears on output lead 116. This pulse appearing on output lead 116 is the pulse referred to above with respect to the coincidence trigger tube 40 of Figure 5. This pulse unblocks tube 261 of Figure 5 permitting the pulses arriving at the control grid of this tube on input lead 114 to trigger the gate control circuit 30, thereby blocking tube 191 of gate circuit 20. This pulse on output lead 116 therefore marks the end of the measuring time interval.

In the foregoing description the output pulse appearing on lead 116 was initiated by the output pulse coming from the scaling circuit of Figure 7 through selector switch 399. It is apparent that the initiating pulse could be taken from any of the previous stages and the selector switch 399 permits selecting this pulse from either the ninth, tenth, eleventh or twelfth stages. For example, if the 512th pulse is desired to end the measuring interval, the selector switch 399 is operated to connect the common terminal 401 to terminal 389.

Referring again to Figure 2, the operation of the standard frequency circuits can now be described. Gate circuit 70, gate control circuit 80, coincidence trigger tube circuit 90 are in all respects similar to gate circuit 20, gate control circuit 30 and coincidence trigger tube circuit 40, respectively. Scaler 100 is the same circuit shown in Figures 6 and 7 for scaler 50 except that there is no provision for obtaining an output pulse from this scaler circuit. That is, there is no selector switch provided.

The operation of the gate control circuit 80 is initiated by the pulses appearing on lead 114 as shown by the wave form on Figure 3–F, vertical line b. This initiates the switching action in gate control circuit 80 in the same manner as in gate control circuit 30 which was initiated by the starting pulse on input lead 113. The switching action of gate control circuit 80 gives rise to an output wave form of the type shown in Figure 3–E, vertical line b. This serves the purpose of unblocking the gate circuit 70 in the same manner as gate circuit 20 was unblocked by the output pulse on lead 122 shown on Figure 3–D, vertical line a.

The unblocking of the gate circuit 70 permits the standard pulses shown on Figure 3–G emanating from the source of standard oscillations 60 on output lead 126 to be transmitted through the gate circuit 70 and be applied on output lead 128 to the scaling circuit 100. Scaling circuit 100 will therefore count these standard input pulses until the gate circuit 70 is again blocked. The blocking of this gate circuit 70 is accomplished by the pulse appearing on output lead 116 of scaling circuit 50 and shown on Figure 3–H, after vertical line e. This output pulse which was described above as being applied to the coincidence trigger tube circuit 40 is also applied to the coincidence trigger tube circuit 90 and unblocks this trigger tube circuit in the same manner as in coincidence trigger tube circuit 40 to permit the input pulses on lead 114 to be applied to gate control circuit 80 on output lead 117. The application of the pulses on lead 117 to gate control circuit 80 switches this circuit back to its normal condition, reducing the potential of the lead 124 as shown on Figure 3–E, vertical line f. The gate circuit 70 is thereby blocked preventing any more pulses from reaching the scaling circuit 100.

In view of the foregoing it now will be apparent that an important object of the invention is achieved, namely that in order to determine the unknown frequency it is merely necessary to compare the reading on the glow discharge tubes of scaling circuit 50 to the reading on the glow discharge tubes of the scaling circuit 100.

Consider now the operation of the invention as a unit rather than as individual circuits as described above. To illustrate the accuracy and ease of operability of the apparatus of the present invention an illustrative example will be worked out and traced through the entire circuit. Assume that the frequency of an alternating current source in the neighborhood of two megacycles is to be measured. If a five megacycle standard oscillator is used and it is desired to obtain an accuracy of 0.1% the counting interval must include at least 1000 cycles of the standard oscillator. This is because the inherent accuracy of the apparatus is plus or minus one cycle of the known frequency. This accuracy is limited by the fact that the frequency of the unknown alternating current source may be as much as plus or minus one cycle out of phase with the standard frequency when the measuring time interval is initiated.

Therefore, to include at least 1000 cycles of the standard frequency approximately 400 cycles of the unknown frequency must be measured. The selector switch 399 of Figure 7 is set to operate from the output of the ninth stage. That is, common terminal 401 of selector switch 399 is connected to terminal 394. We will thereby count 512 cycles (the first integral power of 2 greater than 400) of the unknown alternating current source. With the power supply 110 energized the necessary operating voltages are supplied to the individual circuits as shown on Figure 1.

The glow discharge tubes of the scaling circuit 50 are extinguished and this circuit is cleared by operating reset switches 306 and 385 of Figures 6 and 7, respectively. Operating switch 306 of Figure 6 removes the effective short from across resistor 332. This provides an additional positive bias to the grid of the tube 326 derived from the grid bias network made up of resistors 332, 331, 329 and 323 connected in series between the positive voltage 13 and the common ground connection 19. The additional positive bias causes tube 326 to increase conduction which in turn results in the conduction of the tube 337 and the cessation of current flow through tubes 289 and 316.

Similarly, in Figure 7, the second switch tube 364 is made to conduct by operating switch 385 to remove the short across resistor 384. The grid bias network is here made up of resistors 384, 383, 372 and 367 connected in series between the positive voltage 12 and the common ground connection 19. Similar switches are operated to clear scaler 100.

With lead 111 connected to the output of the unknown alternating current source, a wave shape such as shown on Figure 3–A is impressed on the pulse shaping circuit 10. The unknown frequency oscillations are impressed on the control grid of the tube 151. When the positive portion of the wave shape is reached the switching action of the Schmitt trigger circuit will take effect causing tube 151 to conduct and tube 156 to be cut off. This gives rise to a positive pulse shown on Figure 3-B at the anode of the tube 156. These pulses are transmitted through the differentiating network made up of condenser 169 and resistor 171 to output lead 112 which applies them to the control grid of the tube 191 in gate circuit 20.

The pulses will not pass through tube 191 because the low potential on output lead 122 (indicated on Figure 3-D, prior to vertical line $a$) is impressed on the suppressor grid of the tube 191 effectively blocking conduction in that tube. When the starting pulse shown on Figure 3-C, vertical line $a$, is applied to the gate control circuit 20 on input lead 113 the resulting negative pulse at the anode of the tube 231 initiates the flip-flop action of the electronic switch tubes 238 and 243. This causes tube 238 to start conducting and cuts off tube 243.

The cessation of current flow through the tube 243 gives rise to a more positive potential at its anode, which potential is applied to the output lead 122 through the coupling network 249. The start of the rectangular voltage on output lead 122, shown on Figure 3-D, vertical line $a$, is applied to the suppresser grid of the tube 191. This permits the tube 191 to amplify the input pulses appearing at its control grid. These pulses are subsequently amplified by the tube 211 and pass through the cathode follower tube 218 to output lead 114. The wave shape of the pulses on output lead 114 is shown on Figure 3-F. These pulses are applied on lead 114 to four separate circuits of the invention, namely the coincidence trigger tube circuits 40 and 90, the scaling and pulsing circuit 50 and the gate control circuit 80.

Arrival of the pulses on input lead 114 at the coincidence trigger tube circuits does not affect these circuits as the tubes are maintained in a blocked condition due to the negative potential from lead 16 applied to their suppresser grids. The application of the pulses of lead 114 to the control grid of the buffer amplifier tube in the gate control circuit 80 of Figure 2 causes the the electronic switch tubes in that circuit to switch to their second stable state in a fashion similar to that of gate control circuit 30. The switching action of the gate control circuit 80 results in a higher potential on output lead 124 in a similar manner to that described for output lead 122 of gate control circuit 30.

The higher positive potential occurring on output lead 124, shown on Figure 3-E, vertical line $b$, is applied to the gate circuit 70. The arrival of the higher positive potential on lead 124 unblocks the first tube of the gate circuit 70 and allows the standard oscillations arriving on input lead 126 to be amplified and shaped in gate circuit 70. These pulses shown on Figure 3-G are applied on output lead 128 to scaling circuit 100. Scaling circuit 100 will record there pulses until gate circuit 70 is again blocked.

The pulses occurring on output lead 114 are also applied to the control grid of the tube 281 in scaling circuit 50, Figure 6. The first stage will emit one negative pulse on output lead 345 for every two positive pulses appearing on lead 114. This action will continue through the successive stages of scaling circuit 50 until the fifth stage where the negative pulses will be applied on lead 347 to the control grid of the cathode follower tube 348, Figure 7.

The second type of scaling stage will operate to emit one pulse to the successive stage for every two pulses received. This operation will continue until the 512th pulse, which will activate the ninth stage of the scaling circuit 50. The negative output pulse from this stage instead of being applied to the tenth stage will be applied on lead 389 to terminal 394 of selector switch 399. From here it will be applied on lead 402 to the control grid of the tube 412, Figure 8. This will cause the cessation of current flow in tube 412 and the initiation of current flow in tube 419 thereby giving rise to a positive pulse at the anode of the tube 412. This pulse is transmitted through the cathode follower tube 427 to the output lead 116 and is shown on Figure 3-H, after vertical line $e$.

The application of the pulses on lead 116 to the coincidence trigger tube circuits 40 and 90 will unblock these tubes and permit the pulses occurring on input lead 114 to be amplified and to reach the gate control circuits 30 and 80 respectively. Gate control circuit 30 will switch back to its normal operating condition causing a decrease in the potential on output lead 122 as shown on Figure 3-D, vertical line $f$. This will block the gate circuit 20 and prevent any further pulses from reaching the scaling circuit 50. Similarly the operation of the gate control circuit 80 will lower the potential on the output lead 124 as shown on Figure 3-E, vertical line $f$ and block the gate circuit 70 to prevent the pulses occurring on lead 126 to reach the scaling circuit 100.

In the foregoing manner scaling circuit 50 has recorded the oscillations of the unknown alternating current source during the time interval between the starting pulse input on lead 113 and the stopping pulse on lead 116 represented by Figure 3-D, vertical lines $a$ and $f$ respectively. Also the scaling circuit 100 has recorded the standard oscillations between the time of the appearance of the starting pulses on lead 114 and the stopping pulse on lead 116 represented by Figure 3-E, vertical lines $b$ and $f$ respectively. It is now merely necessary to prepare the readings of the two scaling circuits in the following manner. If scaler 100 has recorded 1299 pulses, the unknown frequency, $f$, could be determined from the following equation:

$$\frac{f}{511}=\frac{5.000}{12\ 9}\text{ megacycles}$$

The above equation would be true if there were no time delay in the scaling circuit of Figures 6 and 7. Actually in the twelve stage scaler described in the embodiment, a signal is delayed approximately 7.8 microseconds in its passage through the scaler. It is therefore possible that scaling circuit 50 has recorded 517 pulses instead of 512. This would mean that four additional pulses had passed through the gate circuit 20 while the 512th pulse was passing through the scaler 50 to the ninth stage. The next pulse (517th) actuated the trigger tube circuits 40 and 90 to turn off the gate circuits 20 and 70 respectively. Therefore if the scaling circuit 100 had recorded 1299 counts the unknown frequency actually would have been $$f=\frac{5.000(516)}{(1299)}=1.9861\pm.0015\text{ mc.}$$

It can be seen that the frequency measuring interval for the above example lasted only 1300 cycles out of 5 million cycles per second of the source of standard oscillations. This is equivalent to a measuring interval of only 260 microseconds and, despite the delay in the scalers, both scalers 50 and 100 count cycles for measuring intervals which differ in duration by less than 0.2 microsecond. These counting intervals are represented on Figure 3-D between vertical lines *a* and *f* for scaler 50 and between vertical lines *b* and *f* on Figure 3-E for scaler 100.

It is accordingly seen that the subject method and apparatus can easily be used for measuring the frequency of frequency modulated oscillators at any required instant after the start of the modulation cycle. If the frequency in the above example was obtained from a frequency modulated oscillator the frequency for the next time interval could be obtained by repeating the above operation and allowing scaler 50 to register 1024 pulses (the tenth stage) before it emits the output pulse for stopping operations. The difference between the frequency for 512 counts obtained above and the frequency for 1024 counts gives the frequency variation over this latter time period. Also, the frequency variation over the entire modulation cycle can be obtained by going through the entire range of scaler 50 and obtaining the differences between successive counts.

An alternative method for using the apparatus with frequency modulated oscillators would be to change the time of initiation of the starting pulse with respect to the initiation of the modulation cycle.

The instrument is particularly applicable for measuring the variation of the frequency modulated oscillator used in conjunction with a proton synchrotron for controlling the acceleration of the protons as they travel in an orbit about the synchrotron track. In one such application the frequency modulated oscillator varies from 343 to 4181 kilocycles in one second and the apparatus of the present invention has been used to measure the frequency of this oscillator at any instant of its modulation cycle.

The apparatus of the subject invention has been used to measure frequencies in a range of 100 kilocycles to 5 megacycles to an accuracy of 0.1% in an interval as short as 200 microseconds.

It is apparent that the subject method and apparatus can be used throughout a large frequency range as the number of scaling stages in scalers 50 and 100 can be extended and the standard oscillator 60 can be chosen to give the highest accuracy with respect to the unknown frequency to be measured.

While the salient features of this invention have been described in detail with respect to one embodiment it will of course be apparent that numerous modifications may be made within the spirit and scope of this invention and it is therefore not desired to limit the invention to the exact details shown except insofar as they may be defined in the following claims.

I claim:

1. Apparatus for measuring the frequency of a frequency-modulated oscillator during an interval of its modulation cycle which comprises in combination, a source of standard oscillations of higher frequency than said frequency-modulated oscillator, amplifying and recording means for registering the number of standard oscillations occurring during said interval, pulse forming means for developing a pulse of voltage for each oscillation of said frequency-modulated oscillator, means for counting and recording each of said pulses occurring during the counting time interval and means for synchronizing the initiation and cessation of the counting time interval with the oscillations of said frequency-modulated oscillator.

2. Apparatus for measuring the frequency of a frequency-modulated oscillator during an interval of its modulation cycle which comprises in combination, means developing a pulse of voltage synchronized with the oscillations of said frequency-modulated oscillator, a gage control circuit responsive to said voltage pulse and developing a rectangular voltage, a gate circuit responsive to said rectangular voltage and said oscillations and developing an output pulse of voltage for each of said oscillations, means for counting and recording the number of said output pulses and for developing a terminating pulse of voltage at the end of the counting time interval, means responsive to said terminating pulse and the output pulses of said gate circuit and adapted to develop a pulse of voltage operable on said gate control circuit to reduce said rectangular voltage and thereby blocking said gate circuit, a source of standard oscillations of higher frequency than said frequency-modulated oscillator, amplifying means for said standard oscillations and recording means for registering the number of standard oscillations occurring during said counting time interval.

3. Apparatus for measuring the frequency of a frequency-modulated oscillator during an interval of its modulation cycle which comprises in combination, means developing a pulse of voltage synchronized with the oscillations of said frequency-modulated oscillator, a gate control circuit responsive to said voltage pulse and developing a rectangular voltage, a gate circuit responsive to said rectangular voltage and said oscillations and developing an output pulse of voltage for each of said oscillations, means for counting the number of said output pulses and for developing a terminating pulse of voltage at the end of the counting time interval, means responsive to said terminating pulse and the output pulses of said gate circuit and developing a pulse of voltage operable on said gate control circuit to reduce said rectangular voltage thereby blocking said gate circuit, a source of standard oscillations of higher frequency than said frequency-modulated oscillator, a second gate control circuit responsive to the output voltage of said gate circuit developing a rectangular voltage, a second gate circuit responsive to said last mentioned rectangular voltage and said standard oscillations and developing a standard output pulse for each of said standard oscillations, means for counting said standard pulses and means responsive to said terminating pulse for blocking said second gate circuit.

4. Apparatus for measuring the frequency of a frequency-modulated oscillator during an interval of its modulation cycle which comprises in combination, a starting pulse generator for developing a pulse synchronized to the oscillations of said frequency-modulated oscillator, a gate control circuit connected to said pulse generator and developing a rectangular voltage in response to the synchronized pulse, a gate circuit connected to said frequency-modulated oscillator and to said gate control circuit, said gate circuit generating an output pulse of voltage for each of said oscillations to be measured, a first scaler circuit for counting and registering the number of said generated output pulses and for developing a voltage pulse at the end of a predetermined number of registered pulses, a coincidence trigger tube connected to the output of said first scaler and to the output of said gate circuit, said trigger tube reversing the conduction conditions of said gate control circuit in response to said scaler developed pulse, said gate control circuit thereby reducing said rectangular voltage and extinguishing the output from said gate circuit, a second gate control circuit connected to the output of said first gate circuit for developing a rectangular voltage, a second gate circuit, a source of standard oscillations of higher frequency than said frequency-modulated oscillator, said second gate circuit being connected to both the output of the second gate control circuit and the standard oscillation source and developing a voltage pulse for each of said standard oscillations, a second scaler circuit connected to the output of said second gate circuit for counting and registering said second gate circuit developed voltage pulses during the counting time interval and a second coincidence trigger tube connected to the output of said first gate circuit for reversing the conduction conditions of said second gate control circuit whereby the output of said second gate circuit is extinguished.

References Cited in the file of this patent
UNITED STATES PATENTS

| Number | Name | Date |
|---|---|---|
| 2,405,597 | Miller | Aug. 13, 1946 |
| 2,455,639 | Anderson | Dec. 7, 1948 |
| 2,510,485 | Vossberg | June 6, 1950 |
| 2,516,189 | Dinsmore | July 25, 1950 |
| 2,576,900 | Brockman | Nov. 27, 1951 |